US005471302A

United States Patent [19]
Khopov

[11] Patent Number: 5,471,302
[45] Date of Patent: Nov. 28, 1995

[54] INTERFEROMETRIC PROBE FOR DISTANCE MEASUREMENT UTILIZING A DIFFRACTION REFLECTING ELEMENT AS A REFERENCE SURFACE

[75] Inventor: Vladimir V. Khopov, St. Petersburg, Russian Federation

[73] Assignee: Renishaw plc, Gloucestershire, United Kingdom

[21] Appl. No.: 211,658

[22] PCT Filed: Jul. 27, 1993

[86] PCT No.: PCT/GB93/01582

§ 371 Date: Jul. 18, 1994

§ 102(e) Date: Jul. 18, 1994

[87] PCT Pub. No.: WO94/05966

PCT Pub. Date: Mar. 17, 1994

[30] Foreign Application Priority Data

Aug. 27, 1992 [RU] Russian Federation ......... RU5056697

[51] Int. Cl.$^6$ .................................................. G01B 9/02
[52] U.S. Cl. ........................... 356/356; 356/354; 356/360; 356/345
[58] Field of Search .................................... 356/354, 356, 356/358, 359, 360, 345

[56] References Cited

FOREIGN PATENT DOCUMENTS

0480028A1  6/1989  European Pat. Off. .

OTHER PUBLICATIONS

W. Jaerisch et al.; "Interferometric surface mapping with variable sensitivity;" Applied Optics/vol. 17, No. 5/1 Mar. 1978.

Primary Examiner—Samuel A. Turner
Assistant Examiner—Robert Kim
Attorney, Agent, or Firm—Oliff & Berridge

[57]  ABSTRACT

An interferometric probe for measuring the distance to the surface of an object has a light source, for example, a super-luminescent diode, that produces a coherent light beam preferably such as to produce a speckle pattern in light reflected from the object. An interferometer includes a beam splitter that produces a reference beam directed towards a reference diffracting reflector and a measuring beam directed towards the surface of the object to be measured. The diffracting reflector produces a plurality of diffraction orders each of which are combined with portions of the light reflected from the surface to produce interference, which is detected by a detector system having a number of individual detectors equal to the number of diffracted orders of the reference beam that are used. Use of the diffracting reflector enables more of the light reflected from the object to be used in the detector and improves signal-to-noise ratio. A further enhancement of signal-to-noise ratio can be produced by the addition of a second detector system that uses the reflected part of the combined beam from the beam splitter and is used differentially to improve the signal-to-noise ratio.

11 Claims, 2 Drawing Sheets

INTERFEROMETRIC PROBE FOR DISTANCE MEASUREMENT UTILIZING A DIFFRACTION REFLECTING ELEMENT AS A REFERENCE SURFACE

INTRODUCTION

The present invention relates to an interferometric probe for measuring the distance to a surface of an object.

The invention is an improvement in the interferometric probe described in European Patent Application No. 480028 A1 in that it provides an improvement in the signal strength generated by the probe.

European Patent Application No. 480028 A1 describes a probe in which a measuring beam of radiation generated within the probe is focused onto the surface of an object. Radiation reflected back from the surface of the object is passed to an detector system which generates interference between the reflected radiation and a reference beam of radiation generated within the probe to create an interference pattern on a detector system. A reflector in the measuring beam path is mounted on an oscillating membrane to vary the length of the path of the measuring beam.

By determining the position of the oscillating reflector at the instant of maximum contrast in the interference pattern detected by the detector, the point at which the path lengths of the measuring beam and the reference beam are equal can be determined. This provides an accurate measure of the position of the surface of the object.

The object of the present invention is to improve the level of the signal generated by the detector system from the interference pattern generated by the interference of the measuring and reference beams.

This object is achieved in accordance with the present invention by focusing the reference beam onto a diffraction grating and creating interference between the reflected measuring beam from the object and a plurality of orders of diffraction of the reference beam emanating from the diffraction grating.

By this means a greater part of the radiation reflected from the object can be used in signal generation than in the known probe, resulting in a greater signal to noise ratio and greater accuracy in the measurements made by the probe.

According to the present invention an interferometric probe comprises:

a radiation source for providing a beam of coherent radiation, a beam splitter for generating from said radiation beam, a measuring beam directed towards the surface of the object the distance to which is to be measured, and a reference beam directed towards a reflector, and for recombining portions of the measuring and reference beams which are reflected respectively from the object and the reflector, a detector system for providing a signal indicative of interference in the re-combined beam, characterised in that the reflector is a diffracting reflector which produces a plurality of diffracted beams, and the detector system produces signals indicative of the interference between the reflected radiation from the surface of the object and at least two of said diffracted beams from the reflector.

In a preferred embodiment of the invention the source is an optical source and the wavelength and coherence of the radiation from the optical source is chosen to produce a speckle pattern in the beam reflected from the object, and the reflected beam is made to interfere with the diffracted beams from the diffraction grating. The optical source may be a super-luminescent diode or a laser.

The detector system may take the form of an array of photodetectors each detector of the array receiving radiation from one of the diffracted orders.

In order to get optimum signal strength in such a system the aperture of the detector should be substantially equal to size of the speckles in the reflected measuring beam. Thus in the preferred embodiment a focusing lens is included at least in the measuring beam path to focus the measuring beam onto the surface of an object.

The radiation beam from the source may also be focused onto the diffracting reflector whereby more radiation is available in the various orders diffracted therefrom and the reflected orders emerge at an increased angle. This is preferably achieved by placing the focusing lens between the radiation source and the beam splitter whereby the same lens focuses both the measuring beam and the reference beam.

The signal to noise ratio of the probe of the present invention may be further increased by the provision of a further detector, or detector array, disposed in a plane at an angle (preferably a right angle) to the plane of the first detector. The second detector, or detector array, will detect radiation from the combined beam leaving the beam splitter which is out of phase with the radiation falling on the first detector.

The polarity of the outputs of the second detector are arranged so that when added to the output of the first detector they contribute to an increase in the overall detector signal. That is the two detector systems can be used differentially to improve signal to noise ratio.

Also in a preferred embodiment of the invention the diffracting reflector is mounted on a optical path modulator which is capable of displacing the reflector along the axis of the beam incident thereon.

The depicted advantages as well as the features of the present invention will be further and better understood, considering the following preferred embodiments of the invention with reference to the accompanying drawings.

DESCRIPTION OF PREFERRED EMBODIMENTS

Figure 1:
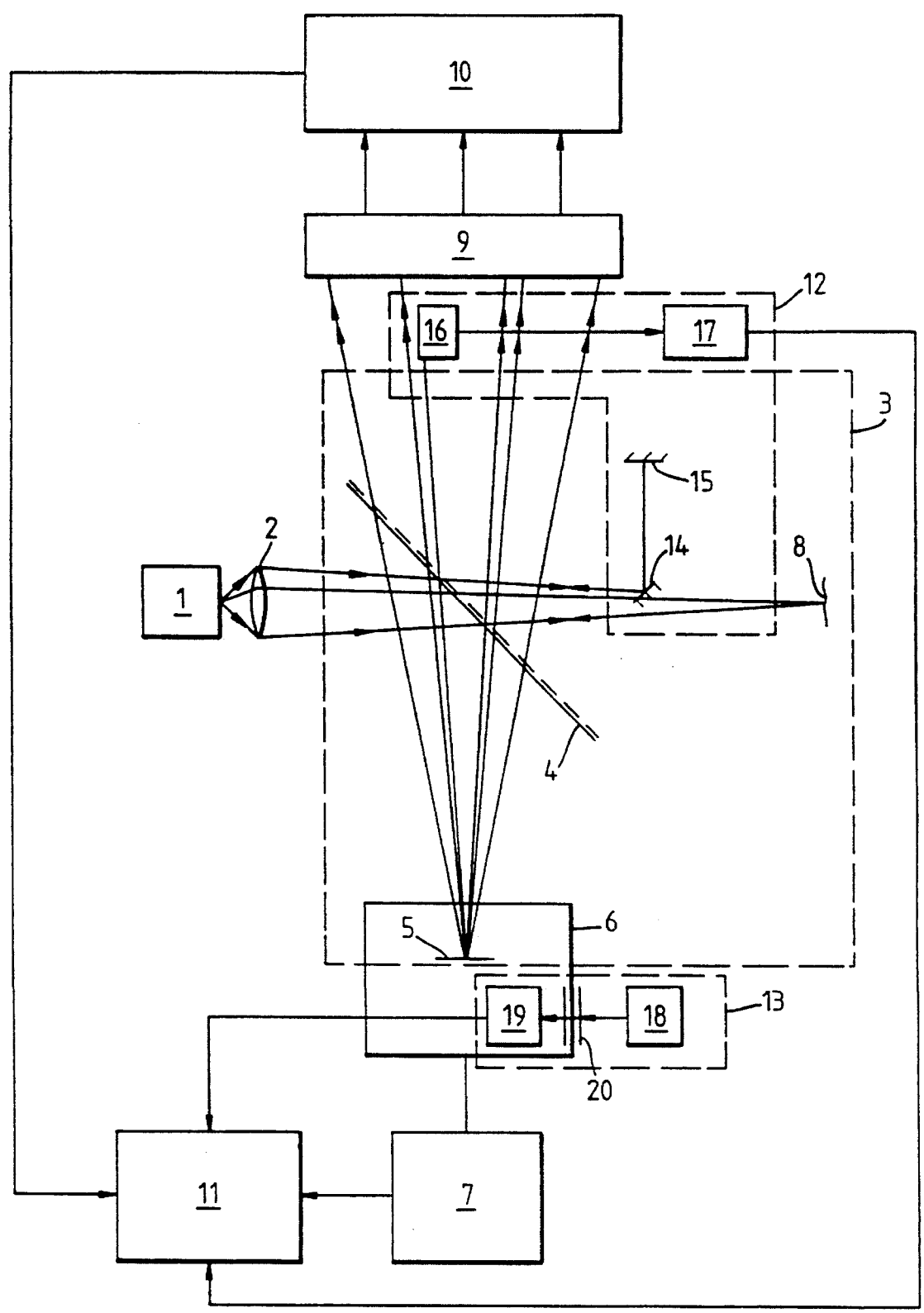
FIG. 1 is a schematic diagram of an interferometric probe according to one embodiment of invention.

Referring now to FIG. 1, the interferometric probe comprises a coherent radiation source 1 of short coherence length (e.g. 30μm), a lens 2, and a Michelson type interferometer. The radiation source, in this example a super-luminescent diode produces a light beam which is split by the beam splitter into a measuring beam focused by the lens onto the surface 8 of the object being measured, and a reference beam focused onto a reference reflector 5. Reflector 5 is made in the form of a diffracting grating turned towards a first surface of the beam splitter. The reflector 5 is mounted on an optical path modulator 6, which includes a device 7 intended to measure displacements of said modulator. The modulator is a simple electro-mechanical actuator, for example a loudspeaker mechanism, and the reflector 5 is mounted on the membrane of the mechanism. The modulator 6 is capable of producing oscillating movements along the optical path of the reference beam. The membrane of the mechanism (not shown) is driven in known manner by an electromagnetic drive in the form of a coil connected to a saw-tooth current generator.

The range of the displacements of the optical path modulator 6 is selected to be not less than two coherence lengths of the radiation source 1. This condition arises from the necessity to provide an absolute position measurement of the reflector in order to be able to determine the position of the surface being measured. The selected range also determines the measuring range of the probe.

The lens 1 is made with a focal length such that radiation from the source 1 is focused onto the reflector 5.

Light impinging on the surface of the object is reflected back in a speckle pattern, and this reflected light is recombined with three orders of the diffracted reference beam at the beam splitter producing interference which is detected at a photodetector 9.

As mentioned above, the input aperture of said photodetector should be equal to the average size of speckle structure. The photodetector 9 is made in the form of a photodetector array, the number of individual detectors being equal to the number of diffraction orders from the grating which are being used in the measuring process, in this example three. Other numbers may be used.

The outputs of said array of photodetectors are connected to a device 10 for sensing the contrast of the interference bands. The output of latter is connected to a device 11 which determines from the position of the optical path modulator 6, the position of the surface 8 of the object. A further device 7 is provided to measure the displacements of the modulator 6 and its absolute position.

The device 10 for sensing the contrast of the interference bands may be made as a known structure, which includes a set of detectors each connected to a respective photodetector of detector system 9, a summing device connected to the outputs of detectors, a differentiator and a voltage comparator. Such a device is described, for example, in the publication by (J. Marchais, "L'amplifacateur operationnel et ses applications" 1971, Masson et C.Editeurs (Paris)).

The device 11 serving to detect the position of the modulator 6 corresponds to the configuration known from European Patent Application No. 480028 A1 and is not therefore described in detail.

Device 7 intended to measure the spatial displacements of the modulator 6 consists of two systems 12 and 13.

The optical part of system 12 for determining the absolute position of optical path modulator, consists of mirrors 14 and 15, whereas electronic part comprise photodetector 16 and device 17 for evaluating the interference bands contrast, which could be made in the same design as device 10 for sensing the contrast of the interference bands.

The system 13 for measuring relative displacements of optical modulator 6 is made in accordance with known principles and contains photodiode 19, light emitting diode 18 and two parallel scale gratings 20 mounted between them, one of said gratings being fixed to the modulator 6. The scale gratings 20 are oriented so that their planes are parallel and their lines perpendicular to the normal of the reflector 5. The output of the photodiode 19 is in the form of pulses indicative of the position of the optical path modulator. These pulses are passed to the device 11 along with the pulses forming the outputs of devices 10 and 17 sensing the contrast of the interference bands.

For the reference reflector 5 any diffracting element may be used, for example, two-dimensional or one-dimensional grating, or even diffusively reflecting surface. The optimum value for the angle covered by the total spread of the diffraction orders of grating equals the angle of view of the detection system. The total aperture of the beam reflected from diffracting reference reflector 5 depends on the number of used diffraction orders and could be up to 10 times larger than that of a single reflected beam. To the same extent the interference pattern area will be expanded, said area being formed at the output of interferometer after light fields reflected from the object and reference reflector 5 are re-combined by the beam splitter 4.

The beams reflected from object 8 and reference reflector 5 are brought to coincidence by beam splitter 4 and then interferometrically compared.

The distance to the object can be derived by analysing the distance from beam splitter 4 to reference reflector 5 in the moment when the maximum contrast in the interference pattern appears. This moment occurs when the optical path length from the beam splitter 4 to the reference reflector 5 is equal to the optical path length from the beam splitter 4 to the surface of the object. At the moment of maximum interference pattern contrast, the device 10 for sensing the contrast of the interference bands produces a pulse to the one of the inputs of device 11 detecting the position of the optical path modulator 6. Moreover, during the apparatus operation the information is fed permanently to other inputs of device 11 about the relative position of optical path modulator 6 in the system 13 for measuring relative displacements of optical modulator 6. Also a pulse is sent from system 12 corresponding to that position of reference reflector 5 when the optical path length from the beam splitter to the reflector 5 equals that from the beam splitter to the mirror 15 which is known. The position in time of the pulse coming from the system 12 corresponds to the maximum contrast of the interference pattern projected on the photodetector 16 of said system as determined by device 17.

When the optical path modulator 6 is moving, at the same time one of the scale gratings 20 located on said modulator 6 and oriented so that it moves in a direction perpendicular to the direction of the scale marks thereon. Then the output of the photodetector will produce pulses with time intervals between them corresponding to the displacement of the scale grating 20 by a distance equal to the grating period.

The device 11 detecting the position of the optical path modulator 6 operates as follows. The sequence of pulses from devices 10 and 17 for sensing the contrast of the interference bands are connected to the setting inputs of flip-flops in device 11. The outputs of flip-flops are connected to the XOR gate which produces a pulse with a duration corresponding to the time interval between moments of pulse occurrence from devices 10 and 17. This time interval is proportional to the difference in distances from beam splitter 4 to the object 8 and to the mirror 15, the order of these pulses defining the sign of said difference. This time interval can be determined by the use of a counter which counts the pulses corresponding to the displacement of the scale grating 20 each of which is equal to the grating period. So, by measuring the distance between beam splitter 4 and mirror 15, and by counting the quantity of pulses in the counter of device 11, it is possible to determine the distance from beam splitter 4 to the measured object.

Figure 2:
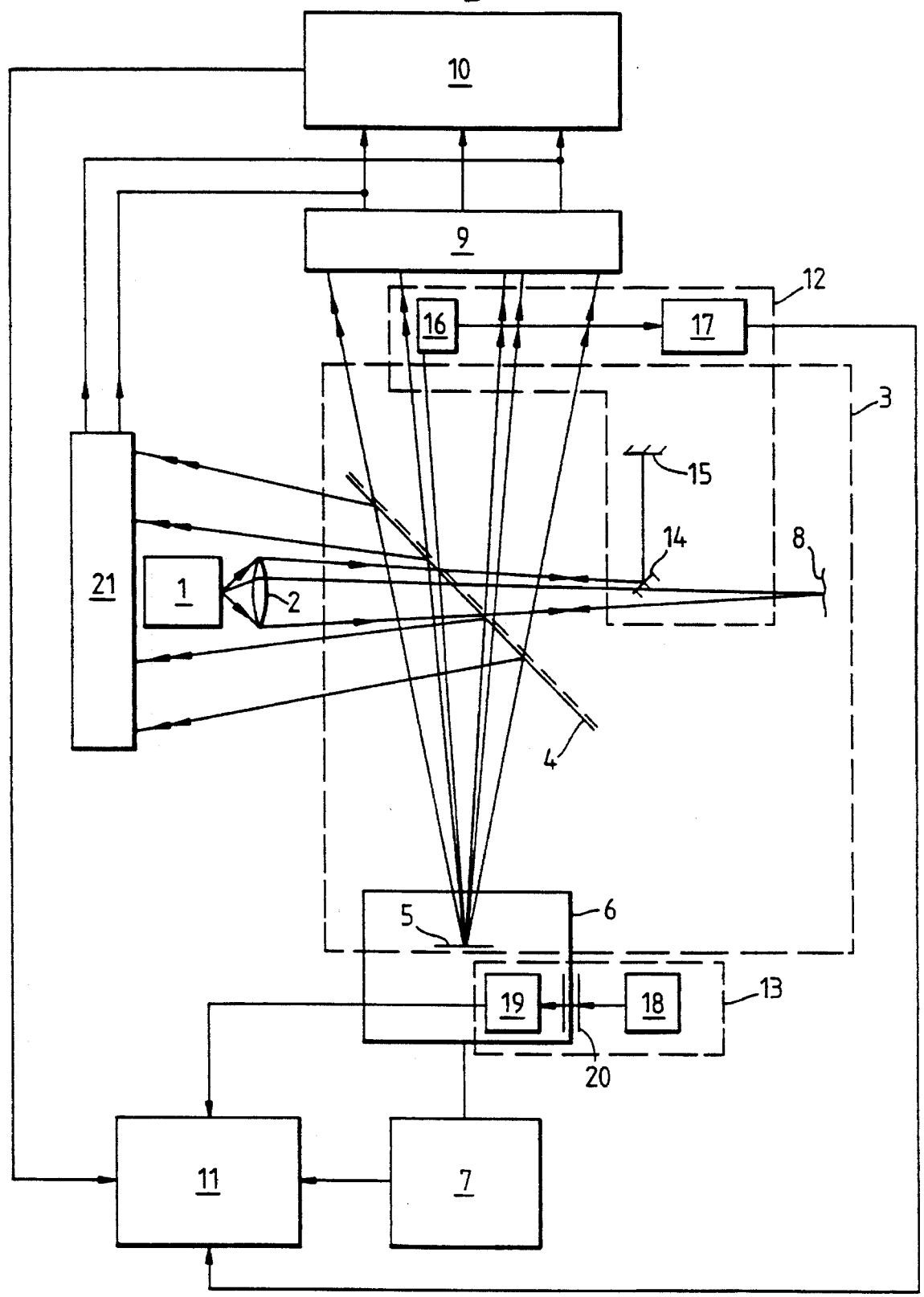
FIG. 2 is a diagram of the apparatus of FIG. 1 provided with an additional photodetector system.

FIG. 2 shows an embodiment of a probe in which an additional photodetector 21 is mounted symmetrically to the beam splitter 4 and out of the aperture of illuminating system. The said additional photodetector may be made in the form of array of detectors, whereas the opposite poles of symmetric photodetectors 10 and 21 are used, these poles being connected together.

The device including additional photodetector operates, basically, similarly to the described above device but, unlike the latter, the signal from the output of device 10 is increased. This is achieved, firstly, owing to the fact that the phases of interference bands are opposite in the planes where photodetectors 10 and 21 are mounted due to the fact that the beam received by detector system 9 has been transmitted through the beam splitter 4, and the beam received by the detector 21 has been reflected from the beam splitter 4. Secondly, the outputs of symmetrically placed photodetectors are connected together and have opposite polarity. Therefore the photocurrent at the input of device 10 is higher, thus increasing signal-to-noise ratio and improving accuracy and rapidity of measurements.

The noise at the output of device 10 may be further reduced if the detecting threshold of detectors in device 10 is made equal to the noise magnitude, then under this condition the channel in which useful signal is absent does not contribute to the total noise value at the summing amplifier output.

The signal enhancement technique of the present invention has been described with reference to a probe in which the diffracting reflector is mounted on a modulator for movement. This embodiment of the invention is suitable when the probe is to be used as a scanning probe, in which it is moved over the surface of a workpiece and scans the surface profile of the workpiece.

The same signal enhancement technique may also be used in a simplified embodiment where the probe is used as a trigger probe for taking measurements at different points on a workpiece. In such an embodiment the modulator can be eliminated so that the path length of the reference beam is fixed at a known length. The variation in the path length of the measuring beam is generated by the machine moving the probe as a whole towards and away from the surface of the object, and the detector system provides a single pulse (trigger signal) at the point of maximum contrast indicating coincidence between the path length of the measuring and reference beams.

I claim:

1. An interferometric probe comprising:
   a radiation source (1) for providing a beam of coherent radiation,
   a beam splitter (4) for generating from said radiation beam, a measuring beam directed towards the surface of an object, the distance to which is to be measured, and a reference beam directed towards a reflector (5), and for re-combining portions of the measuring and reference beams which are reflected respectively from the object and the reflector,
   a detector system (9,10) for providing a signal indicative of interference in the re-combined beam,
   characterised in that the reflector (5) is a diffracting reflector which produces a plurality of diffracted beams, and the detector system (9,10) produces signals indicative of the interference between the reflected radiation from the surface of the object and at least two of said diffracted beams from the reflector.

2. An interferometric probe according to claim 1 characterised in that the wavelength and coherence of the radiation from the source is chosen to produce a speckle pattern in the beam reflected from the surface of the object.

3. An interferometric probe according to claim 2 characterised in that a lens (2) is provided to focus the radiation beam onto the surface of the object.

4. An interferometric probe according to claim 1 characterised in that a lens (2) is disposed between the radiation source (1) and the beam splitter (4) to focus the radiation beam both onto the surface of the object and onto the diffracting reflector (5).

5. An interferometric probe according to claim 1 characterised in that the diffracting reflector (5) is mounted on a modulator (6) for varying the path length of the reference beam.

6. An interferometric probe according to claim 5 characterised in that means (13) are provided for measuring the displacement of the modulator (6).

7. An interferometric probe according to claim 6 characterised in that the means for measuring the displacement of the modulator comprises a pair of scale gratings 20, one of which is mounted on the modulator and the other of which is mounted on the fixed structure, a light source (18) positioned to illuminate the gratings, and a detector system (19) which produces signals proportional to the relative movement between the two gratings (20).

8. An interferometric probe according to claim 5 characterised in that means (12) are provided for establishing when the modulator is at a position such that the path length of the reference beam is equal to a known length.

9. An interferometric probe according to claim 8 characterised in that the means for establishing the modulator position comprises a second reference beam derived by the beam splitter from the source (1), means (14,15) defining a fixed path length for the second reference beam and for reflecting it back to the beam splitter to be re-combined with a portion of the first reference beam after reflection from the reflector (5) and means for generating a signal when the path length of the first reference beam is equal to the length of the second reference beam.

10. An interferometric measuring probe according to claim 1 characterised in that a second detector system (21) is provided and which is positioned to receive a portion of the combined beam leaving the beam splitter (4) which does not fall on the detector system (9), the output of the detector system (21) being connected to the output of the detector system (9) in such a manner that the sum of the two outputs produces an enhanced output signal from the probe.

11. An interferometric probe according to claim 10 characterised in that the detector system (9) receives that part of the combined beam which is transmitted through the beam splitter (4) and the second detector system (21) is disposed in a plane at right angles to the plane of detector system (9) to receive that part of the combined beam which is reflected from the beam splitter (4).

* * * * *